Sept. 6, 1966        H. L. PETERSON        3,270,673
FLUID PRESSURE SYSTEM AND CONTROL MEANS THEREOF
Original Filed July 14, 1961        5 Sheets-Sheet 3
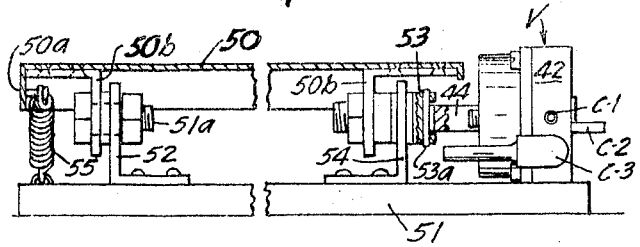
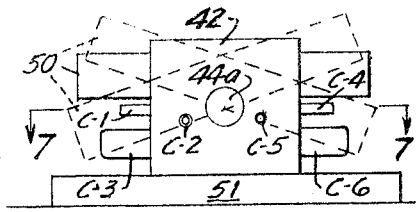
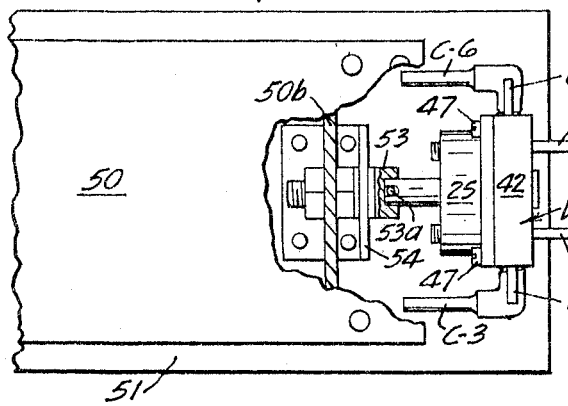
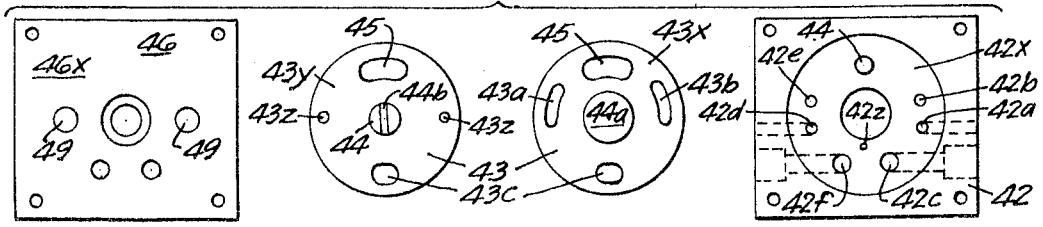
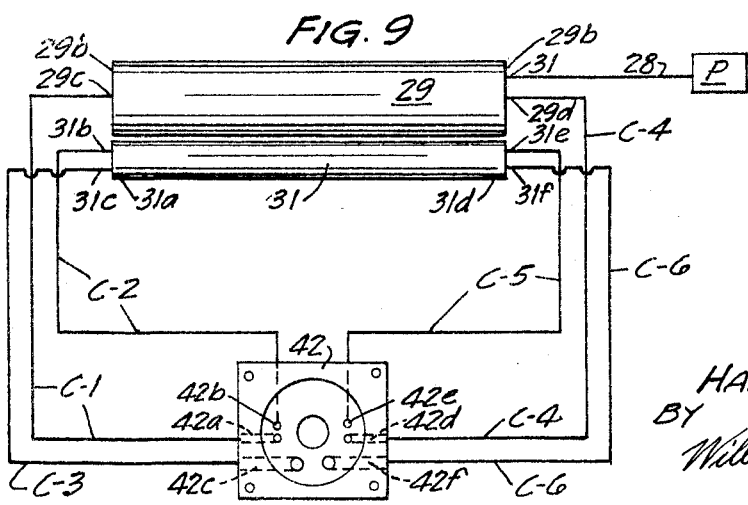
INVENTOR
HARRY L. PETERSON
BY
Williamson & Palmatier
ATTORNEYS

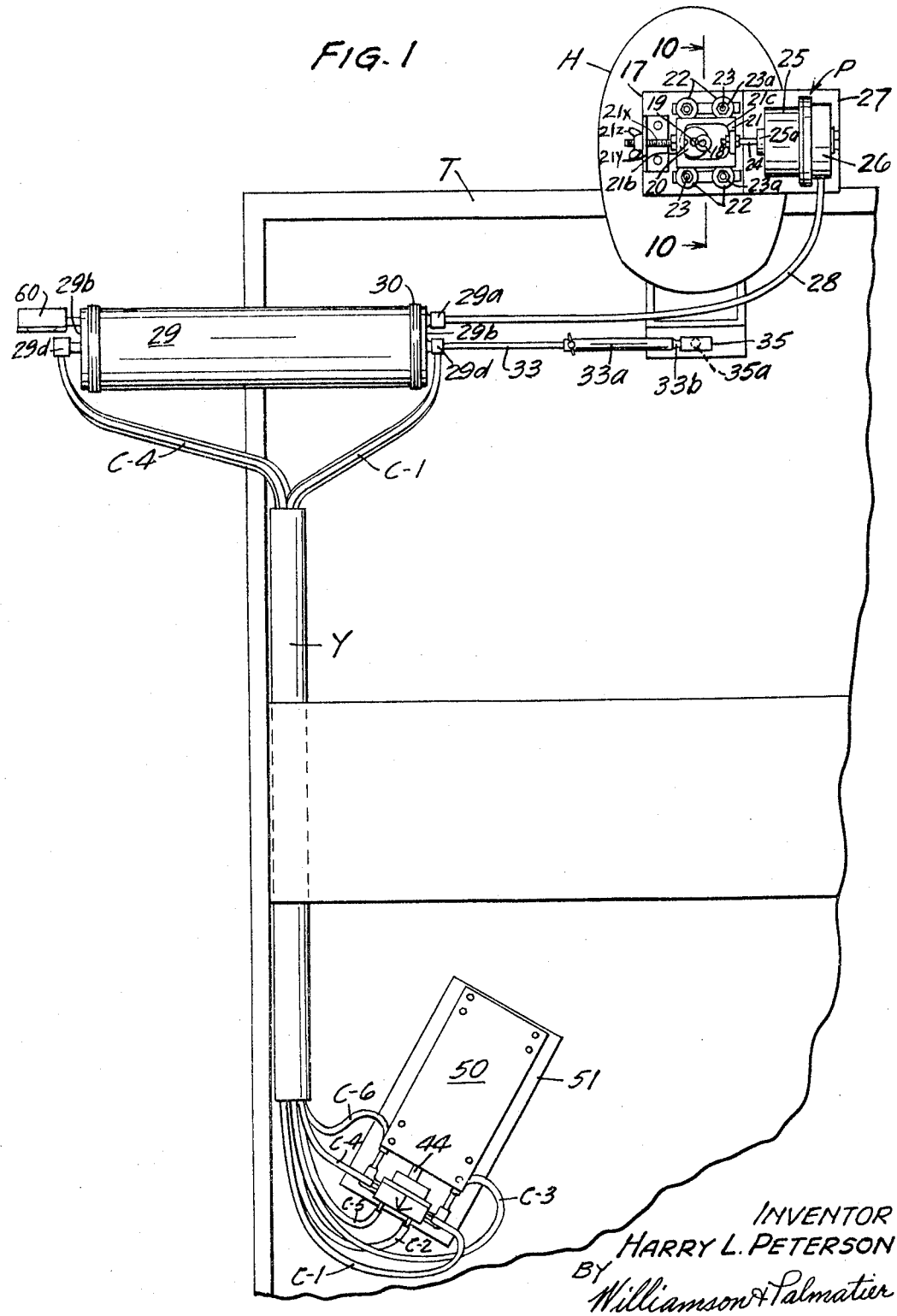

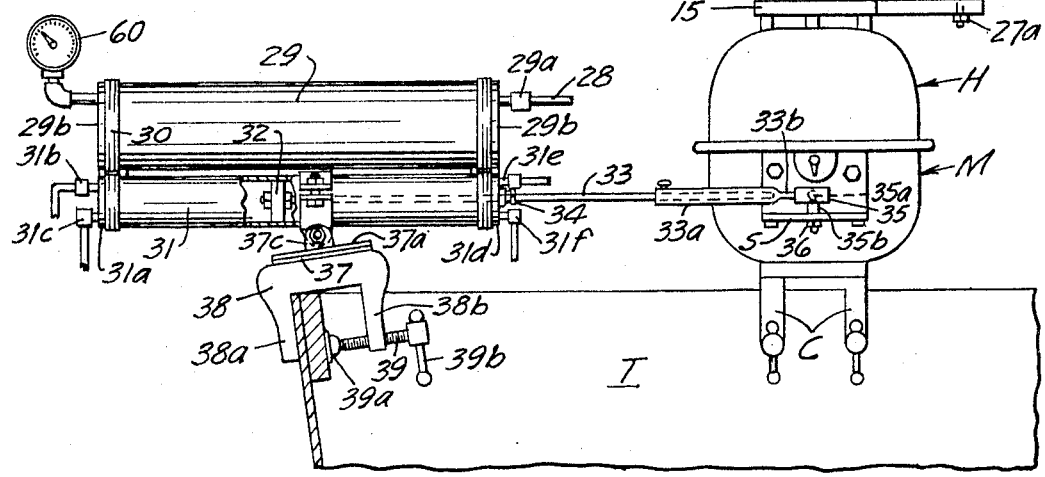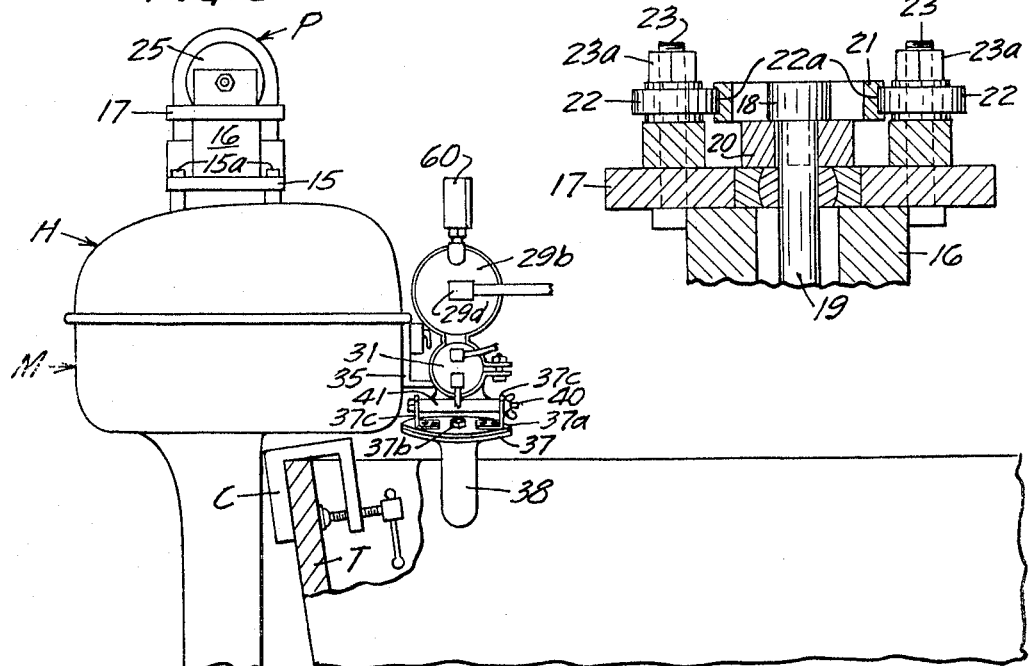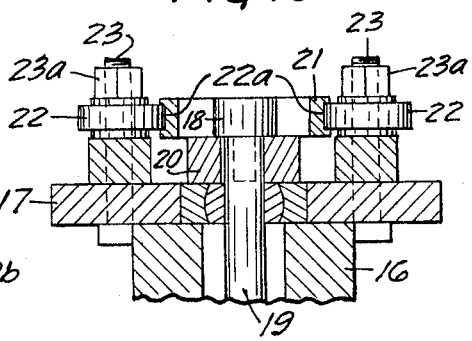

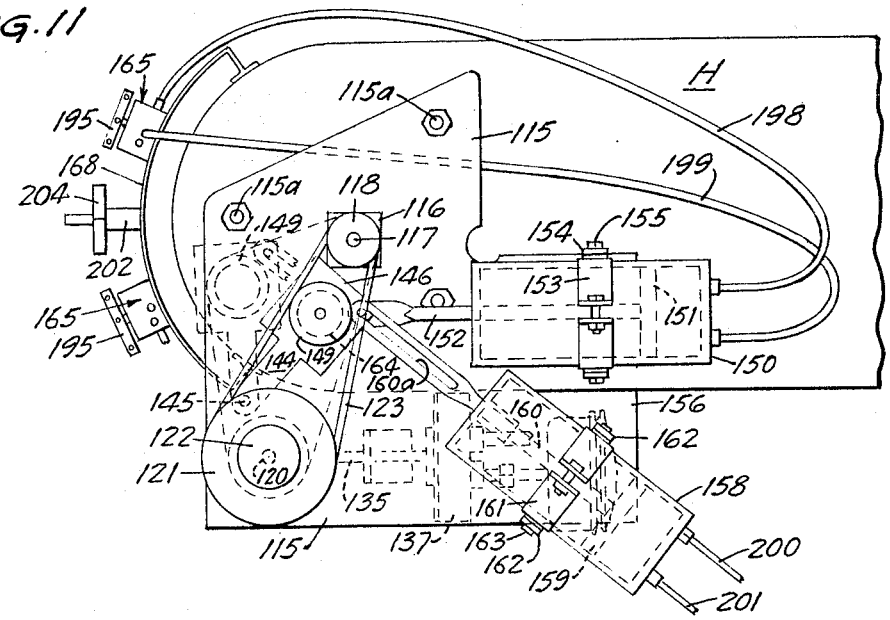

Sept. 6, 1966 H. L. PETERSON 3,270,673
FLUID PRESSURE SYSTEM AND CONTROL MEANS THEREOF
Original Filed July 14, 1961 5 Sheets-Sheet 5
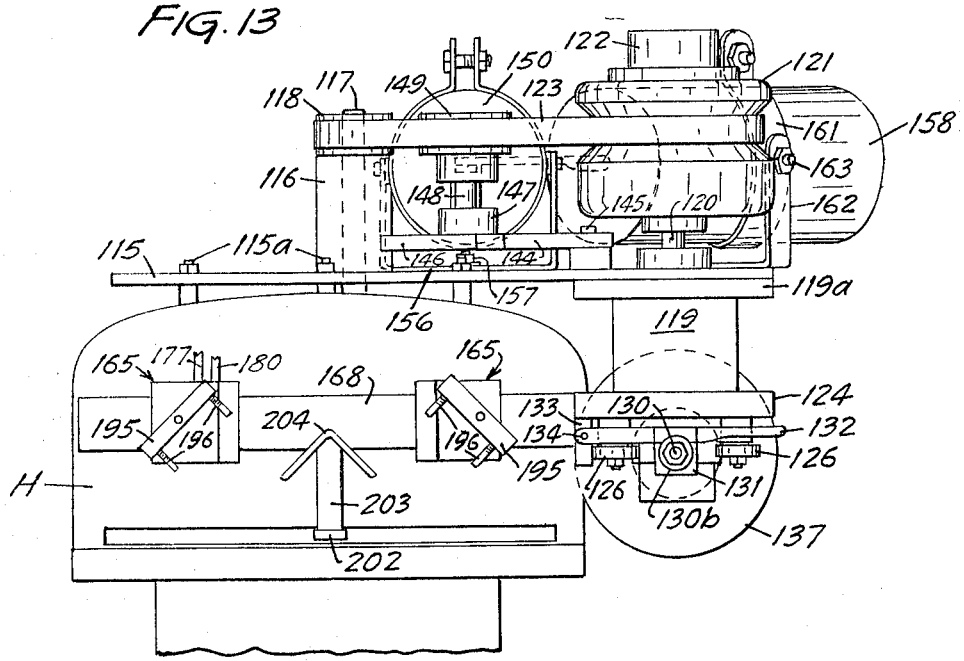
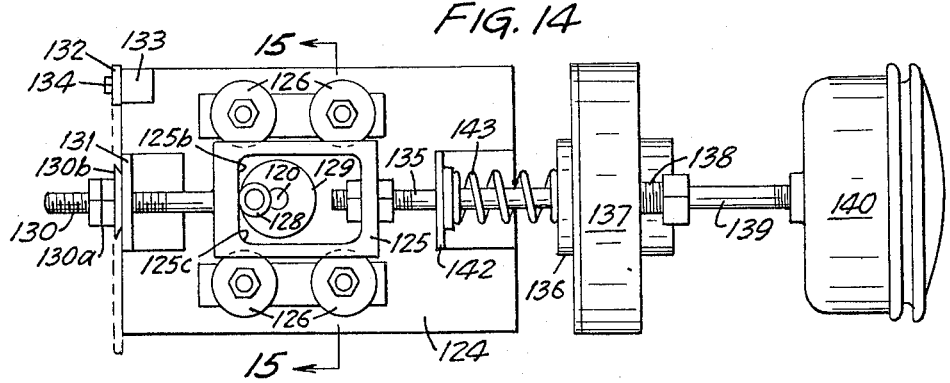
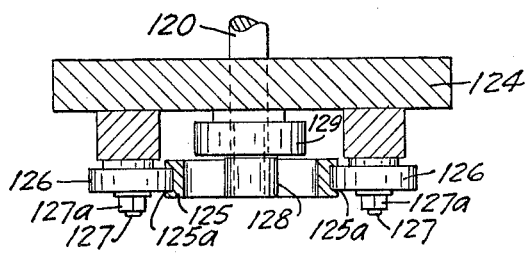
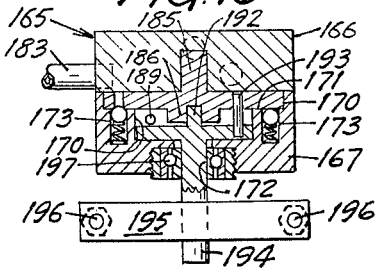
INVENTOR
HARRY L. PETERSON
BY
Williamson & Palmatier
ATTORNEYS great# United States Patent Office 3,270,673
Patented Sept. 6, 1966

3,270,673
FLUID PRESSURE SYSTEM AND CONTROL
MEANS THEREOF
Harry L. Peterson, 5032 34th Ave. S.,
Minneapolis, Minn.
Original application July 14, 1961, Ser. No. 124,095, now
Patent No. 3,135,095, dated June 2, 1964. Divided
and this application Aug. 12, 1963, Ser. No. 301,497
7 Claims. (Cl. 103—24)

This invention relates to a fluid-actuated control system for variable power shifting in opposite directions of an actuating member. The power actuation is controlled by light foot or hand shifting of a swinging or otherwise reciprocable control element which through instantly responsive and efficient valve mechanism, communicates a source of fluid under pressure to the power actuator in the desired direction and to the extent desired. This application is a divisional of my previously filed application Serial No. 124,095, filed July 14, 1961, now Patent No. 3,135,095, granted June 2, 1964.

While particularly applicable for power steering of an outboard motor it is equally well suited to variably shift an actuator element which may control the operation of a number of different devices.

Preferably my invention is employed where a source of mechanical power (rotary or reciprocating) is present for operating or propelling the main device involved. A small amount of power is taken from the primary source to operate a fluid pump or compressor which in turn supplies a source of fluid under pressure to my quickly responsive control valve mechanism which operates the actuator variably as desired through light foot or manual shifting of a control element.

It is an object of this invention to provide a highly efficient fluid pump operated from a source of rotary power such as the power takeoff of an outboard motor, which can be successfully employed in any position, which gives a readily adjustable straight line pull and push action to a diaphragm, and which requires only a minimum number of working parts.

Another object of this invention is to provide a fluid power controlled system which may be used to control steering of an outboard motor behind a boat, where a source of power is derived from a takeoff on the outboard motor to operate a conveniently mounted fluid pump or compressor, and which is provided with automatic variable drive transmitting means interposed in the driving connections to the pump to thereby permit efficient operation of the pump regardless of the speed of operation of the outboard motor.

A further object of this invention is to provide a fluid power control system of the class described in which the automatic variable drive transmitting mechanism is operable in response to movement of the outboard motor throttle whereby the drive to the pump or compressor is proportionately reduced as the speed of the outboard motor is increased.

My invention as applied to power steering of an outboard or other marine engine, is selectively controllable by light foot pressure and manipulation, leaving the hands of the operator free. Its construction and components adapt it for use on any type of outboard motor and many inboard steering systems, and for application to all types of boats utilizing outboard motors. Power means for selectively operating the actuator may be air pressure, air vacuum, water or hydraulic fluid.

These and other objects and advantages of my invention will more fully appear from the following description made in connection with the accompanying drawings, wherein like character references refer to the same or similar parts throughout the several views, and in which:

FIG. 1 is a top plan view showing an embodiment of my fluid-actuated control system applied for power steering, to a conventional type of outboard motor mounted upon the transom or the stern plate of a small boat;

FIG. 2 is a front elevation showing my actuator unit with some portions broken away to show internal parts and also illustrating the forward end of the outboard motor and its steering connection with the actuator piston rod, as well as a front elevation of the preferred type of diaphragm pump and its mounting upon the top of the outboard motor housing and power connection with the upstanding crank shaft of the motor;

FIG. 3 is a side elevation of said form of my invention assembled;

FIG. 4 is a side elevation of a suitable form of power control unit including a selectively operable fluid control valve and a foot-swingable control element for variably operating said valve responsive to light shifting touch;

FIG. 5 is an end elevation showing the outer end of the valve head and the oscillatory treadle member in neutral position in full lines and in the two opposite operating positions in the dotted lines;

FIG. 6 is a top plan view of the control and valve unit, portions of the treadle member being broken away;

FIG. 7 is a horizontal section on a larger scale taken on the line 7—7 of FIG. 5;

FIG. 8 is an exploded view showing parts and faces of the valve mechanism before assembly;

FIG. 9 is a diagrammatical view showing one embodiment of my entire system;

FIG. 10 is a detail vertical section on a larger scale taken transversely through my pump operating mechanism;

FIG. 11 is a top plan view showing a different embodiment of my fluid pump and actuator means therefor, applied for power steering, to a conventional type of outboard motor mounted upon the transom or stern plate of a small boat;

FIG. 12 is a side elevational view of the embodiment illustrated in FIG. 11;

FIG. 13 is a rear elevational view of the modified form;

FIG. 14 is a bottom plan view on an enlarged scale of the pump and actuator mechanism therefor;

FIG. 15 is a cross sectional view taken approximately along line 5—5 of FIG. 14 and looking in the direction of the arrows;

FIG. 16 is a transverse cross sectional view on an enlarged scale of one of the valve mechanisms employed in the variable drive mechanism;

FIG. 17 is an elevational view showing the front face of the rear valve body;

FIG. 18 is a rear elevational view of the rotor of the valve; and

FIG. 19 is an elevational view of the rear face of the front valve body illustrated in FIG. 16.

Referring now in detail to the form of my invention illustrated, a novel, highly efficient fluid pump of the diaphragm type will be first described with its mounting attachment on the upper housing H of a conventional outboard motor M. The motor is attached in conventional form by the clamps C to the transom or stern plate T of a small boat (see FIGS. 1 to 3 inclusive) and is provided with the usual forwardly extending steering tongue S which in most outboards has a swingable rubber grip handle attached thereto. This handle is removed if desired in the attachment of my system.

Secured to the top of the upper housing H of the outboard motor is an integral base plate 15 upon which my pump structure is mounted, as shown said base plate being rigidly secured by a plurality of upstanding bolts 15a threaded at their lower ends into suitably tapped sockets formed in the engine head or suitable metal construction or reinforement of housing H. A rigid supporting sleeve 16 is welded at its lower end or otherwise rigidly affixed to base plate 15 and has rigidly attached to the upper end thereof, a rectangular substantially horizontal support plate 17 upon which stroke-adjustable reciprocable mechanism is mounted for actuation by an eccentrically positioned cam disc 18 rotatably affixed to the upper end of the main crank shaft 19 of the outboard motor through the intermediary of an enlarged concentric disc 20. A rectangular yoke 21 is slidably mounted for reciprocation between two sets of opposed rollers 22, each set as shown comprising a pair of such rollers, having as shown smooth peripheral edges which fit with working clearance longitudinal grooves 21a provided in the side edges of the rectangular yoke 21. Rollers 22 have ball bearing mountings which are affixed to upstanding anchoring bolts 23 provided at their upper threaded ends with securing nuts 23a. The reciprocating yoke 21 is thus positioned and guided for rapid horizontal reciprocation as shown and with substantial elimination of friction and such mounting means require no lubrication. The yoke 21 is centrally apertured to provide a cam track 21b, the working portion of which is at the left of the aperture portion of yoke 21, as viewed in FIG. 1 having a straight rear and medial edge tangentially joining arcuate corner portions 21c as shown. The upstanding cam disc 18 peripherally engages the straight rear edge of the cam track 21b in its eccentric or planetary movement, thereby efficiently retracting yoke 21 rearwardly from the position shown in FIG. 1. Forward movement of yoke 21 (to the right as shown in FIG. 1) is adjustably limited by a longitudinally extending threaded bolt 21x fixed to the rear end of yoke 21 and which works through an aperture in an upstanding angle bracket 21y. A wing nut 21z engages the projecting end of said bolt and may be tightened to withdraw the yoke to the left as seen in FIG. 1, a sufficient distance to disconnect the yoke from driving engagement with the cam 18. This is sometimes desirable to disconnect the device when the outboard motor is run at very high speed.

Yoke 21 is actuated forwardly by its connection with the reciprocating part of the pump. The forward end of the yoke 21 centrally carries an adjustable actuating shaft 24 which is shown projects horizontally and is axially affixed to the reinforcing boss 25a of a diaphragm 25 of conventional type used in diaphragm air pumps. The air pump indicated as an entirety by the letter P is of split housing construction and has an outer header 26 provided with a discharge 26a. The base of pump P is suitably mounted upon a block 27 which in turn is affixed by a pair of bolts 27a to the outer portion of the base plate 15. The discharge 26a of the air pump communicates as shown through a flexible conduit 28 with the intake fitting 29a of an accumulator tank 29, as shown of elongated cylindrical construction, and having closed circular ends 29b.

An actuator cylinder 31 in the form of my invention shown is rigidly secured as by strapping clamps 30 to the accumulator tank 29 being disposed below said tank and as shown in equal length therewith, but substantially smaller diameter. An actuator piston 32 is reciprocably mounted within the cylindrical interior of actuator cylinder 31 having smooth sealed engagement therewith and carries the enlongated actuator rod 33 which projects through a suitable packing gland 34 mounted on the inner or right hand end of the actuating cylinder, as viewed in FIGS. 1 and 2. The actuator rod 33 as shown in FIG. 1 has adjustable connection with an extension link 33a of tubular form, which in turn has a rod extremity 33b at its inner end clamped to a bracket 35 which at its lower end houses the ball of a ball and socket connection 35a, the ball member terminating at its lower end (see FIG. 2) in an attachment bolt 35b which is clamped by a nut 36 to the forward portion of the steering tongue S of the outboard motor.

The actuator unit including the accumulator tank 29 and actuator cylinder 31 is mounted for oscillation on the substantially vertical axis by a small turntable 37a which rotates on a pin 37b affixed to a mounting disc 37 (see FIGS. 2 and 3), which is rigidly secured to the upper edge of a C-clamp 38 having the clamping jaws 38a and 38b with the jaw 38b having threadedly connected therewith the clamping bolt 39 carrying on its inner end a swivel clamp disc 39a and turned by means of a handle 39b. As shown in the drawings the clamp 38 is widely adjustable to accommodate gunwales of boats varying substantially in thickness. The small turntable 37a carries a pair of widely spaced, upstanding ears 37c (see FIG. 3) between which a threaded pivot pin 40 swivelly connects a pivot sleeve 41 affixed transversely to the bottom of the actuator cylinder at its medial portion. The clamp 38 as shown is adapted to secure the actuator unit for swivel movement on a transverse horizontal axis and also for limited oscillation on a substantially vertical axis through the intermediary of the turntable 37a and its related parts and the intermediary of the swivel pin 40 and pivot sleeve 41.

Fluid pressure with my system or apparatus, or decompression may be applied to either end of the actuator piston 32 selectively controlled by a highly efficient valve mechanism V, later to be described in detail. When pressure is applied to one side of the actuator piston 32, the interior of the cylinder at the opposite side thereof is communicated with valve V for decompression. In the form of the invention illustrated where the actuator is powered by air, each end of the actuator cylinder is provided with two air fittings or nipples. Thus, the left hand end 31a of actuator cylinder 31 is provided with an air inlet nipple 31b and a decompression or air discharge nipple 31c. The right hand end 31d of actuator cylinder 31 is provided with air inlet nipple 31e and an air discharge or decompression nipple 31f. These nipples are all connected by flexible conduits to the appropriate passages for interconnection and communication, later to be described in my efficient valve mechanism V.

While a number of valving and conduit systems V may be employed to successfully control and power my actuator mechanism, I have illustrated in the accompanying drawings a compact and readily portable unit which combines suitable valve mechanism with a shiftable control element readily responsive to light human touch, as by foot operation. This unit illustrated in FIGS. 4 to 7 inclusive of the drawings, may be readily positioned at a point removed from the actuator unit, as for example in the waist or forward portion of a boat, when my system is employed for power steering. A plurality of flexible conduits interconnect as shown, related passages or ports at the two ends of the actuator cylinder 31 with corresponding passages in a stationary head 42 of valve mechanism V, and also supply air under pressure from tank 29 to two intake passages of the valve mechanism. Stationary valve head 42 as shown, is circularly recessed at its inner end to provide a shallow chamber having a planar circular face 42x for seating against an oscillatory valving disc 43, later to be described in detail. A series of ports, hereafter to be described, communicate through circular face 42x and are circumferentially spaced thereon, each communicating with an extension of the overall passage which in turn passes through the body portion of head 42, terminating in a fitting or nipple for connection with its appropriate conduit. In the diagrammatic view FIG. 9, the ports in dotted lines are viewed in the relationship assumed when looking from the outer end of the valve head while in the exploded view 8 the valve head has been turned and is viewed from the circularly recessed chamber with the face 42x exposed.

Thus, in the form shown (see FIGS. 1 and 9) a conduit C-1 connects a discharge passage 29c at the left end of the air accumulator tank with air supply inlet 42a of said valve head.

A second flexible conduit C-2 as shown, connects the air intake passage 31b at the left end of the actuator cylinder with the air discharge passage 42b disposed as shown in FIGS. 1, 8 and 9 in close relation to the air inlet port 42a. A third flexible conduit C-3 connects the outlet or decompression port 31c at the left end of the actuator cylinder with the air outlet or decompression passage 42c of the valve head 42. The decompression passages in the actuator cylinder ends and in the valve head are preferably or larger diameter than the air supply passages to increase the efficiency of my system.

It will be noted in the form of valve mechanism illustrated as exemplary, that corresponding passages are symmetrically disposed on right and left sides of the stationary valve head 42. A fourth flexible conduit C-4 connects an air discharge port 29d at the right end of accumulator tank 29 with an air supply passage 42d in the valve head 42. Another flexible conduit C-5 connects the air supply passage 31e at the right end of actuator cylinder 31 with the air discharge passage 42e disposed closely above the air inlet passage 42d on valve head 42. A sixth conduit C-6 connects the air outlet or decompression pasage 31f at the right end of actuator cylinder with the decompression passage 42f disposed near the bottom portion of the circular face of the valve head 42.

An oscillatory valving disc 43 is coaxially mounted with the valve head 42, being keyed or otherwise affixed to the enlarged portion 44a of a stub shaft 44. Valving disc 43 has a passage-communication face 43x which fits flush against the circular face 42x of valve head 42. On said face 43x two shallow arcuate communication grooves are formed, identified by the numbers 43a and 43b respectively, and extending concentrically of said face. The groove 43a is of a length to span and interconnect the ports or passages 42a and 42b in the valve head 42 when disc 43 is turned through a partial revolution (as shown, about 18° from neutral) in one direction. The arcuate groove 43b is similarly formed, being concentric to the valving disc 43 and of a length to nicely span and intercommunicate the passages 42d and 42e when disc 43 is turned from neutral position through the same angulation in the opposite direction.

A third and somewhat wider but shorter, shallow communication groove 43c is formed in the lower face 43x of the valving disc, for selective communication with either of the decompression passages 42c or 42f formed in the stationary valve head. As shown, groove 43c is disposed medially of the intercommunicating grooves 43a and 43b and will register with the decompression passage 42c at the same time that communication groove 43a spans and interconnects the ports or passages 42e and 42d. Likewise, when the wider decompression groove 43c communicates or registers with the decompression passage 42f, communication groove 43b simultaneously communicates and interconnects the passages 42b and 42a of the stationary valve head 42.

To limit oscillation of the valve disc 43, a projecting pin 44 is carried near the upper portion of the face 42x, working in a confining arcuate slot 45, which is formed through the upper portion of the valve disc 43. The ends of said slot, with contacting pin 44 limits oscillation in both directions. A thick closure cap 46 for the valve mechanism has a smooth planar inner face 46x which is adapted to contact the frame or peripheral portion of the stationary valve head 42, and be secured as by a plurality of threaded bolts 47 thereto. A pair of diametrically disposed passages 46a and 46b are formed through cap member 46, having mounted therein springs 48 which press against ball members 49, said ball members engaging against the outermost, generally planar face 43y of the valving disc to perform two functions, to wit, first to equally apply pressure inwardly against the disc to cause the same to seat very flush and smoothly for sealed relation against the planar face 42x of the valve head, and secondly to cooperate (see FIG. 8) with small circular depressions 43z which are diametrically disposed on the face 43y of the valve disc to locate and retain the disc in neutral position. The pressure on springs 48 is adjustable by two threaded plug members X which threadedly engage the tapped ends of the passages 46a and 46b.

A swinging or oscillatable treadle member 50 is mounted upon elongated base plate 51 which serves also as the mounting for the valve mechanism V at one end thereof. Treadle member 50 is of elongated, rectangular shape, having as shown a depending flange 50a. As shown near the ends thereof, it is provided with rigidly secured, depending ears 50b, which are mounted for swinging on a horizontal axis parallel to the base plate 51. As shown, the rear ear 50b is pivoted by a nutted bolt 51a upon an upstanding angle bracket 52, which is secured to the base plate 51. Near its forward end, the forward ear 50b of the treadle 50 is adjustably affixed to a trunnion sleeve 53 which is pivotally connected with the upstanding arm of an angle bracket 54, also fixed to base plate 51. The trunnion sleeve 53 has a socket with a pin 53a therein which engages, drivably, with the slot 44b of the stub shaft 44 for driving or oscillating the valving disc 43. A strong coil spring 55 interconnects one end of the treadle with the base plate and is tensioned so that when the plate is swung from neutral position in either direction the tension will return or tend to return the plate to its normal neutral position.

To nicely accommodate and compact the several flexible conduits C-1 to C-6 inclusive, I prefer to arrange them and contain them side-by-side throughout their intermediate portions, in a tubular insulated flexible housing or harness Y, as illustrated in FIG. 1, which may be constructed of a tough flexible plastic material such as polyethelene. I prefer to relieve pressure between the faces 42x and 43x of the valve parts by forming a small outlet or vent bore 42z (see FIG. 8) through valve head 42.

*Operation*

From the foregoing description the operation of my system or apparatus may be obvious, but will be briefly described as follows:

With the actuator unit including the actuator cylinder 31 and tank 29 installed in proper relation to the power driven device such as an outboard motor, the actuator rod is properly connected with extension linkage 33 which in turn is connected by releasable ball and socket connection with the element 36b affixed to the steering tongue of the motor. The ball-equipped element 35b fits a socket in the extremity portion of the extension 33 which has a light spring completing a socket, but susceptible to release if the motor is suddenly jarred by striking of the main underwater housing with an object, thus releasing the control. The pressure gauge 60 may be connected with one end of the accumulator tank, for obvious purposes.

With the valve mechanism and control unit mounted at a point removed from the actuator and the power driven device to be actuated, the base plate 51 of such unit may be supported upon the floor or deck of the boat in convenient position for the treadle plate 50 to be oscillated on its longitudinal axes by tilting of the foot in one or the other directions, with light touch. Turning or swinging of the treadle plate 50 in the one direction turns the stub shaft 44 rigidly interconnected with valving disc 42 to its extreme position wherein two of the related ports for communication of air pressure, vacuum or other fluid medium is taken from the source of fluid under pressure shown as the tank 29 and communicated within the actuator cylinder 31 against one side of the piston 32. Simultaneously the decompression groove 43c is in communication with the decompression port 42c or 42f as the case may be, for communication through either conduit C-3 or C-6 with the opposite side of the actuator cylinder, thereby venting air and giving decompression on the opposite side of the cylinder from that actuated by the positive force. This simultaneously applied decompression and pressure actuation makes my actuator piston rod very responsive to the light human control. When actuator piston 32 is moved to the right as viewed in FIG. 2, it will shift the outboard motor through connection with its tongue 35, turning the main assembly of the outboard motor and its rudder portion to swing the boat and power turn the same in a starboard direction.

When the shiftable control unit, as shown comprising the treadle plate 5 is swung or shifted by oscillation in the opposite direction the other communication ports of the stationary head 42 are placed in communication by one of the arcuate communication grooves (either 43a or 43b) of the oscillatory valving disc 43, thereby applying the forced air, other fluid, or vacuum to the right hand side of the actuating piston 32 and thus retracting piston 32 and its rods 33 to the left, as shown in FIGS. 1 and 2, and turning the outboard in the opposite direction. Simultaneously with such action decompression is made available to the left hand side of the cylinder 31 and the piston 32, making the actuator readily responsive to the light human control.

It is to be understood that the turning of valve disc 43, while intercommunicating the passages, as previously recited, simultaneously closes and shuts off communication of the alternative pressure discharge and decompression passages. This is readily ascertainable from study of the exploded view, FIG. 8.

With my improved structure and the simultaneous decompression connection with one end of the cylinder while the piston is actuated by fluid pressure connected to the opposite end and with my high responsive valve mechanism and treadle control, the actuator rod 32 responsive to foot control, can be controlled to slowly creep from one extreme position to another or by a fast shifting of the treadle the actuator may be moved to full position instantly, or on the other hand by proper foot control, the actuator rod may be moved slowly to only a portion of its full stroke in either direction. Thus through light human touch as by the foot, a very efficient and variable control is provided.

While I have illustrated the preferred form of my invention it will be understood that many alternatives in the conduit and valve system may be substituted, all within the scope of my invention. Also, with the same apparatus and mechanism illustrated and described another form of my invention may be practiced, requiring only two conduits communicating the valve mechanism with the actuator cylinder. I have reduced this form to practice and successfully used the same on the same apparatus, and will now describe this form of system.

The actuator tank 29 is connected at each of its ends with the fluid intake passages 31b and 31e of the actuator cylinder so that communication of fluid pressure is always present when the device or outboard motor is operated. However, the passage communicating with the two ends of cylinder 31 are restricted by suitable orifices or any restrictive medium. The piston 32 is thus balanced by opposing pressures in cylinder 31 until actuation is desired. The decompression passages 31c and 31f at opposite ends of cylinder 31 are connected with the valving mechanism precisely as shown in my preferred form and the valve is consequently utilized only for controlling alternate decompression at one or the other ends of the cylinder. Thus with my control and with the larger decompression outlets 31c and 31f as contrasted with the very restricted fluid inlets to the cylinder ends, the restricted pressure with the fast decompression at the opposite side of piston 32 will, by power, move the actuating piston 32 and the actuator rod 33.

Referring now to the modified form of my invention illustrated in FIGS. 11 through 19, it is pointed out that this embodiment of my invention is directed primarily to the fluid pump and the actuator means therefor including a novel automatic variable drive mechanism which is operable to permit efficient operation of the pump or compressor regardless of the speed of operation of the outboard motor. An integral base plate 115 is secured to the top of the upper housing H of the outboard motor by any conventional securing means such as a plurality of upstanding bolts 115a threaded at their lower ends into suitably tapped sockets formed in the engine head or suitable metal construction or reinforcement of housing H. It will also be noted that the base plate 115 which is horizontally oriented projects outwardly beyond one side of the housing H as best seen in FIGS. 11 and 13.

Referring now to FIG. 13 it will be seen that a rigid bearing housing is welded at its lower end or otherwise rigidly affixed to the base plate 115 and projects upwardly therefrom. An elongate upstanding extension 117 of the main crank shaft of the outboard motor projects through the bearing housing and has a pulley 118 affixed to the upper end thereof for rotation therewith. Thus during operation of the outboard motor, the pulley 118 will also be driven.

A bearing housing 119 is secured to the lower surface of the base plate 115 through the mediary of a mounting plate 119a and projects downwardly therefrom. This bearing housing 119 accommodates a vertically disposed driven shaft 120 which projects upwardly beyond the base plate 115 and which has a variable speed pulley unit 121 mounted on the upper end portion thereof. A retaining element 122 is affixed to the upper terminal end of the driven shaft 120 and serves to retain the pulley in mounted relation on the shaft 120. The pulley unit 121 is of the double cam type wherein the cam driving assembly prevents pulley spread but automatically compensates for tension and belt alignment and is sold under the trademark "Hi-Lo" Variable Speed Pulley D.C. V series, by the Hi-Lo Manufacturing Company. A V-type endless belt is trained around the drive pulley 118 and the variable speed pulley 121 whereby drive is transmitted from the main crank shaft extension 117 to the driven shaft 120.

A rectangular substantially horizontal support plate 124 is rigidly affixed to the lower end of the bearing housing 119 and this support plate has mounted thereon a stroke-adjustable reciprocable mechanism. This reciprocable mechanism includes a rectangular yoke 125 which, as best seen in FIG. 14, is slidably mounted for reciprocation between two sets of opposed rollers 126. The rollers of each set have, as shown in FIG. 15, longitudinal grooves 125a provided in the side edges of the rectangular yoke 125. The rollers 126 have ball bearing mountings which are affixed to the upstanding bolts 127 provided at their lower threaded ends with securing nuts 127a.

The reciprocating yoke 125 is thus positioned and guided for rapid horizontal reciprocation as shown and with substantial elimination of friction and this particular mounting means requires no lubrication. The yoke 125 is centrally apertured to provide a cam track 125b, the working portion of which is at the left of the apertured portion of yoke 125, as viewed in FIG. 14, having straight rear and medial edge tangentially joining arcuate corner portions 125c. The bearings of the rollers 126 are completely sealed so that even though these rollers might be exposed to water, no rusting or corrosion will occur and absolutely no lubrication is required.

The driven shaft 120 has an eccentrically positioned cam disc 128 affixed thereto for rotation therewith through the mediary of an enlarged concentric disc 129. This cam disc 128 peripherally engages the straight rear edge of the cam track 125b in its eccentric or planetary movement, thereby efficiently retracting the yoke 125 rearwardly from the position shown in FIG. 14. Forward movement of the yoke 125 (to the right, as shown in FIG. 14) is adjustably limited by longitudinally extending threaded bolt 130 affixed to the rear end of the yoke 125 and which works through an aperture in an upstanding angle bracket 131. A retaining nut 130a along with the generally frusto-conical washer 130b adjustably limits longitudinal movement of the threaded bolt 130 by engagement with the angle bracket 131. It will be seen that the nut and washer nut and washer assembly may be adjusted to withdraw the yoke to the left, as seen in FIG. 14, a sufficient distance to disconnect the yoke from driving engagement with the cam disc 128. This is sometimes desirable to disconnect the stroke-adjustable reciprocable mechanism from driven relation with respect to the outboard motor.

Means to permit instantaneous withdrawal of the yoke from driving engagement with the cam 128 are provided and to this end it will be seen that an elongate arm 132 is pivoted to a post 133 by a pivot pin 134 to permit vertical swinging movement of the arm about a substantially horizontal axis. The arm has a wedge shaped edge which may be forced between the frusto-conical washer and the angle bracket to very effectively and quickly shift the bolt 130 and the yoke 125 to the left and out of diriving engagement with the came 128. Thus this engagement of the reciprocable mechanism may be accomplished instantaneously by the operator by merely moving the elongate arm into wedged engagement between the washer and angle bracket.

The yoke 125 is actuated forwardly by its connection with the reciprocating part of the pump. The forward end of the yoke 125 centrally carries an adjustable actuating thrust transmitting shaft 135, which as shown, projects horizontally and is axially affixed to the reinforcing boss 136 of the diaphragm (not shown) of a conventional type used in the diaphragm air pump or compressor 137. The compressor or air pump 137 is provided with an intake fitting 138 connected by a conduit to an air cleaner 140 of the filter type. The air pump 137 is also provided with a pair of discharge fittings 141 as best seen in FIG. 12.

A depending angle bracket 142 is affixed to the lower surface of the support plate 124 and depends therefrom and the actuating shaft 135 projects through an aperture in this angle bracket as best seen in FIG. 14. The coil spring 143 is interposed between the bracket 142 and the reinforcing boss 136 of the air compressor diaphragm so that the yoke will be pulled to the left against the boss of the spring 143 during the working stroke of the yoke.

This embodiment of the fluid pressure pump and the stroke-adjustable reciprocable mechanism, as pointed out above, is also used for supplying fluid pressure in the fluid pressure steering system for an outboard motor in the manner of the embodiment of FIGS. 1 through 10. However, provision is made in the embodiment of FIGS. 11 through 19 for automatically adjusting the drive between the extension of the main crank shaft of the motor and the reciprocable mechanism so that the proper drive transmitting ratio is maintained between the motor and stroke reciprocating mechanism even though the motor is being operated at relatively high speeds.

To this end it will be seen that an idler pulley attachment or belt tightener is provided which includes an elongate generally horizontally disposed arm spaced above and pivotally mounted at one of its ends to the base plate 115 by a pivot 145. It will therefore be seen that the arm 144 is mounted for horizontal swinging movement about a vertical axis in a plane substantially parallel to the base plate 115. The arm 144 has a small rectangular mounting plate 146 affixed to the other end portion thereof and this mounting plate has a bearing 147 secured to the upper portion thereof. A vertically disposed shaft 148 has its lower end journaled in the bearing 147 and has a pulley 149 affixed to the upper end thereof for rotation therewith. Thus it will be seen that the pulley 149 is swingable into and out of engagement with the belt 123 to permit tightening of the same and thereby cause spreading of the respective pulley discs of the variable speed pulley unit 121. It will be appreciated that as the belt 123 is tightened, whereby the pulley discs of the variable speed pulley unit 121 are spread, the pulley unit will not serve as a speed reduction means and the pulley 118 and the pulley unit 121 will have the same r.p.m.

Means are provided for shifting the belt tightening pulley and includes a first fluid pressure cylinder 150 having a piston 151 movable therein, and a piston rod 152 connected to the piston for movement therewith. This first cylinder 150 has an arcuate clamping strap 153 secured to the exterior thereof. Upstanding support arms are pivotally connected to opposite sides of the clamping strap 153 by pivots 155, as best seen in FIG. 12. The lower end portions of the support arms 154 are rigidly connected to a cylinder support plate 156 which is mounted on the base plate 151 for horizontal revolving movement about a pivot 157.

A second cylinder 158 is mounted in close proximity to the first cylinder 150 and is provided with a piston 159 having a piston rod 160 secured thereto for movement therewith. This second cylinder 158 is also provided with an arcuate clamping strap 161 clamped to the exterior thereof which is pivotally secured to a pair of upstanding arms 162 by means of pivots 163. The arms 162 have their respective lower ends rigidly connected to a cylinder support plate 156 for movement therewith. Thus it will be seen that both the cylinders are mounted on the base plate 115 for horziontal as well as swinging movement so that in effect a universal connection is provided for the first and second cylinders with respect to the base plate.

The free end of the piston rod 152 is pivotally connected to the upper end of a post 164 which is mounted in vertically extending relation on the mounting plate 146 of the belt tightening pulley unit. The piston rod 160 of the second cylinder has an elongate longitudinally extending slot 160a formed therein and this slot accommodates the upper end of the post 164 in sliding relation therewith. Thus it will be seen that extension of the piston rod 152 of the first cylinder 150 from the retracted position causes swinging movement of the pulley 149 in a belt tightening direction. It will also be seen that during this extensive movement of the piston rod 152, the piston rod 160 will also be partially extended. However, during retraction of the piston rod 152 from the fully extended position, the lost motion connection between the post 164 and the slot 160a in the piston rod 160 permits relative movement between the belt tightening pulley unit and the piston rod 160. The piston rod 160 when fully retracted serves to pull the belt tightening pulley unit beyond the position produced by retraction of the piston rod 152 of the first cylinder. The universal connection of the cylinders permits this additional retractive movement.

It will therefore be seen that the first and second piston and cylinder units may be sequentially extended and retracted for tightening and loosening the belt 123 to thereby variously adjust the driving speed of the yoke 125 and the actuating shaft 135. It is desirable that operation of the piston and cylinder units be controlled in response to changes of speed of the outboard motor and valve control means are provided for controlling operation of the piston and cylinder units during manual adjustment of the throttle control. This throttle responsive valve control means includes a pair of identical valve control mechanisms 165. It will be seen that the valve control mechanism 165 located at the left of FIG. 13 and positioned uppermost in FIG. 11 is connected in flow controlling relation with respect to the first cylinder 150 while the other valve control mechanism is connected in flow controlling relation with respect to the second cylinder 158.

Each of the valve control mechanisms 165 includes a rear body member 166 which as best seen in FIGS. 16 and 17 is of substantially rectangular configuration. Each valve control mechanism 165 also includes a substantially rectangular shaped front body member 167 of corresponding shape and size to the rear body member as clearly shown in FIGS. 16 and 19. The rear body member 166 is provided with apertures 166a therethrough adjacent the respective corners thereof and the front body member is similarly provided with apertures 167a through which suitable bolt assemblies extend to permit releasable attachment of the front and rear body members together. Referring now to FIG. 13 it will be seen that the rear body members 166 of each of the valve control mechanisms 165 are detachably secured to an attachment plate 168 which is of arcuate configuration and which is detachably connected to the rear portion of the motor housing H.

Referring now to FIGS. 16 and 19 it will be seen that the inner face of the front body member 167 of each valve control mechanism is provided with centrally located circular recesses 169 and 170 arranged concentrically with respect to each other. It will be seen that the recess 170 is of shallower depth than the recess 169 and presents a substantially flat annular shoulder 171. The deeper recess 169 has a centrally located aperture 172 therethrough as best seen in FIGS. 16 and 19. It will also be seen that the front body member 167 has a pair of openings 173 therein which extend axially through the shoulder 171 in diametrically spaced relationship, the function of these openings 173 to be explained more fully hereinbelow.

The rear body member 166 has a relatively flat inner face provided with a centrally located recess 174 therein as best seen in FIG. 17. An inlet passage 175 extends from one edge of the rear body member 166 and terminates in an inlet port in the inner face of the rear body member. This inlet passage is provided with a suitable fitting 177, which is connected by a conduit to the compressor or pump to permit fluid under pressure to be supplied to the valve.

The rear body member 166 is also provided with another passage 178 having one end terminating in a port 179 in the front face of the rear body member and having a fitting 180 connected to the other end thereof in communicating relation therewith. The fitting 180 connects the valve member with the rear or compression side with one of the cylinders. The rear body member is also provided with still another passage 181 terminating at one end in a port 182 in the front face of the rear body member 166 and having a fitting 183 affixed to the other end thereof in communicating relation therewith. The fitting 183 is also connected to the conduit which extends in communicating relation to the rear portion of one of the cylinders for controlling the belt tightening unit. Referring now to FIG 17 it will be seen that each rear body member 166 is provided with a positioning pin 198 affixed to the forward face thereof and projecting axially forwardly therefrom.

Each of the valve control mechanisms 165 also includes a rotor 184 which, as best seen in FIGS. 16 and 18, is of circular configuration and is positioned in the volumetric space defined by the recess 170. Each of the rotors is revolvably mounted in its associated valve control mechanism. Each rotor 184 is provided with an axially extending rotor shaft 185 which, as best seen in FIG. 16, projects into and is journaled for rotation in the recess 174 in the rear body member 166. It will be seen that this rotor shaft 185 projects axially from the rear face of the rotor and it will also be seen that a circular centrally located axially projecting rotor hub 186 is integrally formed with and projects forwardly from the front face thereof.

Referring now to FIG. 18 it will be noted that the rear face of the rotor 184 has an air passage therein in the form of an arcuate groove 187 which does not extend completely through the rotor in an axial direction. This air passage 187 serves to interconnect the intake port 176 with the port 179 and permits fluid under pressure to be transmitted to the particular cylinder to cause extension of the associated piston rod. The rotor for each control valve mechanism is also provided with an arcuate slot 188 therethrough disposed in relatively close proximity to the groove 187 and this air slot 188 when disposed in communicating relation with the port 182 of the associated rear body member permits air to escape from the associated cylinder through the slot and into the volumetric space defined by the recess 169. In order to permit the escape of air exteriorly of each of the valve control mechanisms 165 when air is escaped into the recess 169, it will be seen that the front body member 167 is provided with an escape port 189 as best seen in FIG. 16, which interconnects the recess 169 with the exterior.

Each rotor is provided with an elongate pin-receiving slot 190 therethrough, the slot 190 receiving and accommodating the pin 190a carried by the rear body member 166. It will therefore be seen that when the rotor 184 is revolved about its axis, rotary movement of this rotor will be limited by the cooperative engagement of the pin 190a and the slot 190.

Means are also provided for actuating or revolving the rotor 184 and this means includes a small circular actuator plate 191 which is positioned in relatively snug fitting relation within the recess 169 of the front body member 167 as best seen in FIGS. 16 and 19. This actuating plate has an axially extending centrally located positioning pin 192 affixed to the rear face thereof and projecting axially into the recess of the rotor hub 186. This actuator plate is also provided with a motion-transmitting pin 193 affixed to the rear face thereof and eccentrically arranged with respect to the center of the plate 191. The motion-transmitting pin 193 is received within an aperture 193a in the rotor 184. Thus it will be seen that rotary motion of the actuating plate 191 is transmitted through the pin and aperture 193 and 193a to the rotor 184 to thereby cause corresponding movement of the rotor.

The actuating plate 191 for each valve control mechanism also has an actuating shaft integrally formed therewith and projecting axially from the front face thereof as best seen in FIG. 16. This shaft projects through the opening 172 in the front body member 167 and has an actuating arm 195 fixedly connected to the end portion thereof. The arm 195 has a pair of cam follower pins 196 fixedly connected with the respective end portions thereof and projecting normally therefrom as best seen in FIG. 13. It will be noted that the front body member 167 is provided with a suitable ball bearing unit 197 for the shaft 194.

Spring urge ball detents 190a are positioned in the recesses 173 of the front body member 167 of each valve control mechanism and serve to urge the rotor against the front face of the rear body member 166. Referring again to FIGS. 11 and 13 it will be seen that the fittings 180 and 183 for the uppermost valve control mechanism are connected by conduits 198 and 199 to the rear end of the cylinder 150. Similarly, the fittings 180 and 183 of the other valve control mechanism 165 are connected by conduits 200 and 201 to the rear end of the cylinder 158. As pointed out above the fittings 177 for the valve control mechanism 165 are connected by suitable conduits to the air compressor or pump 137. Therefore when the uppermost valve control mechanism 165 as viewed in FIG. 11 is actuated, the cylinder 150 will be supplied with air under pressure or will be decompressed, and if the lowermost valve control mechanism 165 is actuated then the other cylinder 158 will be supplied with air or alternatively decompressed.

Actuation of the valve control mechanisms is controlled by the throttle handle 202 which has an upstanding post 203 affixed thereto, the upper end of the post being provided with an inverted V-shaped cam 204 as best seen in FIG. 13. The inclined surfaces of the cam 204 serve to engage the cam follower pins 196 of each valve control mechanism 165 and to shift the same to cause revolving movement of the rotor whereby to control the passage of air into and from the respective cylinders.

*Operation*

During operation of my fluid pressure system, the compressor or pump 137 may be used primarily for supplying fluid under pressure to a fluid pressure steering system for outboard motors. The drive to the actuator mechanism for the pump or compressor 137 is therefore automatically controlled as the manual throttle handle is adjusted.

When the outboard motor is rendered inoperative, there will be no pressure in the fluid pressure system and the piston rods 152 and 160 of the pistons 150 and 158, respectively, will be retracted and the belt 123 will assume the position illustrated in full line configuration of FIG. 11. When the motor is started, the compressor will be operated to immediately pressurize the system. The valve actuating arms of the valve control mechanism 165 will both be in the position of the actuating arm of the valve control mechanism at the right as viewed in FIG. 13. Thus these valve actuating arms will be inclined upwardly and to the left so that the groove 187 on the rear face of the rotor intercommunicates the ports 176 and 179. Air will therefore be supplied to the cylinders 150 and 158, respectively, thereby causing extension of the piston rods thereof. When the piston rods are extended, the belt tightener will assume the position illustrated in the dotted line configuration of FIG. 11 thereby tightening the belt so that there is a 1 to 1 drive ratio between the crank shaft extension 117 and the driven shaft 120. The pressure in the system can be utilized for very effectively steering the boat at this relatively low speed.

When the speed of the outboard motor is increased by moving the throttle control handle 202 to the right as viewed in FIG. 13, the inverted V-shaped cam will engage the cam follower pin 196 located on the right side of the actuating arm 195 of the left valve control mechanism as viewed in FIG. 13. This causes rotation of the rotor 184 so that the air passage groove 187 is moved out of intercommunicating relation with respect to the ports 176 and 179 and where the air slot 188 registers with the port 182 to permit air to flow through said slot. Air will flow into the volumetric space defined by the recess 169 in the front body member of the left valve control mechanism and this air will thereafter flow through the escape port 189. Thus the cylinder 150 is decompressed and the normal spring action of the variable speed pulley unit 121 exerted by the respective pulley discs thereof will exert tension on the endless belt and thereby cause swinging movement of the belt tightening pulley unit to the right and subsequent retraction of the piston rod 152. This movement of the belt tightener pulley unit will produce a corresponding loss motion effect with respect to the piston rod 160 of the cylinder 158. The drive ratio between crank shaft extension 117 and the driven shaft 120 will therefore be reduced from a 1 to 1 ratio when in the extended position to a 2½ to 1 ratio when only the piston rod 152 is in the retracted position.

Thereafter, if the throttle control handle is moved further to the right to additionally increase the speed of the outboard motor, the right valve control mechanism 165 will then be moved from the position illustrated in FIG. 13 to an oppositely inclined position whereby the cylinder 158 will be decompressed and the spring action of the pulley disc of the variable speed pulley unit 121 will cause movement of the belt tightener pulley unit and retraction of the cylinder rod 160 to the retracted position. When the belt assumes the position illustrated in full line configuration of FIG. 11, the driving ratio between the crank shaft extension 117 and the driven shaft 120 is approximately 3½ to 1. Thus the outboard motor may be driven at full throttle without danger of imparting excessive stress on the compressor.

Similarly, the reverse situation occurs when the throttle control handle is moved to the left or in a speed reducing direction. The piston rod 160 will be extended to shift the belt type pulley unit in the belt tightening direction so that the driving ratio between the crank shaft extension 117 and the driven shaft 120 will be approximately 2½ to 1 rather than 3½ to 1. When the valve control mechanism 165 located at the left of FIG. 11 is thereafter actuated as the throttle control handle is moved to the left, the cylinder 150 will be provided with air under pressure and extended to further tighten the belt 123 causing spreading of the pulley disc of the pulley unit 121 whereby the driving ratio between the crank shaft extension 117 and the driven shaft 120 will be approximately 1 to 1. Thus it will be seen that the outboard motor may be operated at any desirable speed without the attendant danger of damage to the compressor or pump unit.

Although the particular throttle control handle is illustrative of the type which swings on an arc the actuating V-shaped cam for controlling the actuator arms of each of the valve control mechanisms will also be incorporated for use with throttle controls of the type involving a revolvable knob. In this type of construction, the V-shaped cam may be mounted on a rack which meshes with a gear affixed to the revolvable throttle control knob. By revolving the throttle control knob, the rotary motion will be converted to rectilinear motion through such a gear and rack arrangement whereby the cam will be moved rectilinearly and caused to sequentially engage two such valve control mechanisms.

From the foregoing it will be seen that I have provided a novel fluid pressure system which is especially adapted for use in a steering control system for outboard motors.

It will be seen from the preceding paragraphs that my novel fluid pressure system derives its power from the outboard motor but which includes automatic variable speed control means responsive to changes in speed of the outboard motor whereby the outboard motor may be driven at any desirable speed without the attendant danger of over-stressing the compressor pump unit.

Thus it will be seen that I have provided a novel and improved fluid pressure system especially adapted for a steering system for an outboard motor, which is not only of simple and inexpensive construction and operation, but one which functions in a more efficient manner than any heretofore known comparable devices.

It will of course be understood that various changes may be made in the form, details, arrangement and proportions of the various parts without departing from the scope of my invention.

What is claimed is:

1. In a fluid pressure system for use in supplying fluid pressure to the steering system of outboard motors and the like, said fluid pressure system comprising
   a fluid pump mechanism,
   a longitudinally reciprocating operating member connected with said pump mechanism for operating the same,
   a driven rotary shaft,
   means drivingly interrelating said driven rotary shaft with said reciprocating member to reciprocate the latter,
   a variable speed expansible and retractable pulley unit adjustably mounted on said driven rotary shaft for shifting movement relative thereto and for rotation therewith, said variable speed pulley being normally urged to the retracted position,
   an endless belt drivingly connecting said variable speed pulley unit with a drive shaft of a rotary motor of the type having a manually operable throttle control, means for varying the tension of said belt comprising a shiftable idler pulley mechanism engaging said belt and being selectively shiftable to variously adjust the tension of said belt, means for shifting said idler pulley mechanism including at least one piston and cylinder fluid pressure motor connected with said idler pulley mechanism and being operable to cause shifting movement thereof, said fluid pressure motor being connected in communicating relation with said pump mechanism and reeciving fluid under pressure therefrom, and a valve control mechanism interposed in fluid controlling relation with respect to said fluid pressure motor and having a shiftable actuator element disposed in obstructing relation with respect to the throttle control of the rotary motor, said actuator element being shiftable by the throttle control of the rotary motor during movement of the throttle control whereby said idler pulley mechanism will be shifted to vary the tension of said belt in response to changes in speed of the rotary motor.

2. The fluid pressure system as defined in claim 1 wherein said driving means interrelating said driven rotary shaft with said reciprocating member comprises a reciprocating yoke connected with said longitudinally reciprocating operating member for operating the same, said yoke having a cam track thereon, a circular rotary cam eccentrically affixed to said driven rotary shaft and engaging said cam track on said yoke for reciprocating the same.

3. The structure as defined in claim 2 wherein said reciprocating yoke is provided with substantially parallel longitudinal edges, and a pair of opposed sets of bearing mounted rollers engaging the parallel longitudinal edges of said yoke to guide the latter during reciprocating movement thereof.

4. In a fluid pressure system for use in supplying fluid pressure to the steering system of outboard motors and the like, said fluid pressure system comprising a fluid pump mechanism, a longitudinally reciprocating operating member connected with said pump mechanism for operating the same, a driven rotary shaft, means drivingly interrelating said driven rotary shaft with said reciprocating member to reciproate the latter, a variable speed expansible and retractable pulley unit adjustably mounted on said driven rotary shaft for shifting movement relative thereto and for rotation therewith, said variable speed pulley unit being normally urged to the retracted position, an endless belt drivingly connecting said variable speed pulley unit with said drive shaft of a rotary motor of the type having a manually operable throttle control, means for varying the tension on said belt comprising a shiftable idler pulley mechanism engaging said belt and being selectively shiftable to variously adjust the tension of said belt, means for shifting said idler pulley mechanism including a pair of piston and cylinder fluid pressure motors each being connected with said idler pulley mechanisms and being successively operable to cause shifting movement of said idler pulley mechanism, said fluid pressure motors being connected in communicating relation with said pump mechanism and receiving fluid under pressure therefrom, and a pair of valve control mechanisms each being interposed in fluid controlling relation with respect to one of said fluid pressure motors and having a shiftable actuator element disposed in obstructing relation with respect to throttle control of the rotary motor, said actuator elements for each of said valve control mechanisms being shiftable by the throttle control of the rotary motor during movement of the throttle control whereby said idler pulley mechanism will be shifted successively by said piston and cylinder fluid pressure motors selectively in directions to increase and reduce the tension of said belt in response to changes in speed of the rotary motor.

5. The structure as defined in claim 4 wherein said actuator element comprises an inverted V-shaped cam and said shiftable actuator element for each valve control mechanism comprising a cam follower.

6. The structure as defined in claim 4 wherein said means drivingly interrelating said driven rotary shaft with said reciprocating member comprises a reciprocating yoke connected to said operating member and having substantially parallel longitudinal edges, opposed sets of bearing mounted rollers engaging the parallel longitudinal edges of said yoke to guide the latter during reciprocating movement thereof, and a circular camming member having connection eccentrically with a power driven shaft extending longitudinally thereof, and said yoke having a cam track disposed medially of the ends thereof and extending essentially transversely to said operating member and disposed at least partially in the orbit of the periphery of said camming member whereby said yoke and operating member connected thereto will be longitudinally moved in one direction by said camming member.

7. A fluid pump device for supplying fluid under pressure to a fluid pressure steering system for outboard motors and the like, said device comprising a fluid pump mechanism, longitudinally reciprocating operating member connected with said pump mechanism for operating the same, a reciprocating yoke connected with said operating member and having parallel longitudinal edges, means defining guideways on said longitudinal edges of the yoke, opposed sets of bearing mounted rollers mounted in guide ways on said yoke to guide and support the yoke during reciprocating movement thereof, each set comprising a plurality of longitudinally spaced apart rollers, a circular camming roller having connection eccentrically with a power driven shaft and extending longitudinally thereof, said camming roller being revolvable in an orbit by the shaft, said yoke having a cam track disposed medially of the ends thereof and extending essentially transversely to said reciprocating operating member and disposed at least partially in the orbit of the periphery of said circular camming roller whereby said yoke and the operation member connected thereto will be longitudinally moved in one direction by the cooperative action of said camming roller and said bearing mounted rollers, and means for urging said yoke to longitudinal movement in the opposite direction.

References Cited by the Examiner

UNITED STATES PATENTS

| | | | |
|---|---|---|---|
| Re. 18,112 | 6/1931 | Moulet | 103—213 |
| 503,529 | 8/1893 | Dutton | 103—38 |
| 1,545,638 | 8/1925 | Clay | 74—230.17 |
| 1,597,690 | 8/1926 | Moulet | 103—38 |
| 2,040,667 | 5/1936 | Moulet | 103—213 |
| 2,359,960 | 10/1944 | Anderson | 103—38 |
| 2,447,707 | 8/1948 | May | 103—38 |
| 2,585,732 | 2/1952 | Braman | 74—230.17 |
| 2,599,195 | 6/1952 | Memety | 103—38 |
| 2,828,907 | 4/1958 | Oehrli | 230—11 |

FOREIGN PATENTS 474,403    4/1929    Germany.

MARK NEWMAN, *Primary Examiner.*

DONLEY J. STOCKING, SAMUEL LEVINE,
*Examiners.*

W. L. FREEH, *Assistant Examiner.*